(12) United States Patent
Scallie et al.

(10) Patent No.: US 10,325,580 B2
(45) Date of Patent: Jun. 18, 2019

(54) VIRTUAL MUSIC EXPERIENCES

(71) Applicant: Red Pill VR, Inc, Los Angeles, CA (US)

(72) Inventors: Laurent Scallie, Los Angeles, CA (US); Alejandro Koretzky, Los Angeles, CA (US); Karthiek Reddy Bokka, Los Angeles, CA (US); Naveen Sasalu Rajashekharappa, Los Angeles, CA (US); Luis Daniel Bernal, Debary, FL (US)

(73) Assignee: Red Pill VR, Inc, Los Angeles, CA (US)

( * ) Notice: Subject to any disclaimer, the term of this patent is extended or adjusted under 35 U.S.C. 154(b) by 0 days.

(21) Appl. No.: 15/672,482

(22) Filed: Aug. 9, 2017

(65) Prior Publication Data
US 2018/0047372 A1 Feb. 15, 2018

Related U.S. Application Data

(60) Provisional application No. 62/373,339, filed on Aug. 10, 2016.

(51) Int. Cl.
*G10H 1/00* (2006.01)
*G06F 3/0481* (2013.01)
*G06F 3/0484* (2013.01)

(52) U.S. Cl.
CPC ....... *G10H 1/0008* (2013.01); *G06F 3/04815* (2013.01); *G06F 3/04847* (2013.01); *G10H 1/0066* (2013.01); *G10H 1/0025* (2013.01); *G10H 1/0091* (2013.01); *G10H 2210/026* (2013.01); *G10H 2210/031* (2013.01); *G10H 2210/051* (2013.01); *G10H 2210/056* (2013.01); *G10H 2210/066* (2013.01); *G10H 2210/076* (2013.01); *G10H 2210/086* (2013.01); *G10H 2210/105* (2013.01); *G10H 2220/005* (2013.01); *G10H 2220/116* (2013.01); *G10H 2220/131* (2013.01); *G10H 2240/085* (2013.01)

(58) Field of Classification Search
CPC .... G06F 3/048; G06F 3/0481; G06F 3/04815; G06F 3/04847; G10H 1/0008; G10H 1/0066; G10H 2220/116; G10H 2210/031; G10H 2210/056; G10H 2210/066; G10H 2210/076; G10H 2210/086
USPC ............................................. 700/94; 84/169
See application file for complete search history.

(56) References Cited

U.S. PATENT DOCUMENTS 6,411,289 B1 * 6/2002 Zimmerman .......... G09B 15/00
345/419
2007/0044642 A1 * 3/2007 Schierle ............... G10H 1/0008
84/616

(Continued)

*Primary Examiner* — Jesse A Elbin
(74) *Attorney, Agent, or Firm* — Hickman Palermo Becker Bingham LLP; Adam C. Stone

(57) ABSTRACT

Techniques for generating a virtual music experience. The techniques include source separating an arbitrary digital audio input into a plurality of source-separated tracks. Sets of music features are determined from the plurality of source-separated tracks and provided to a video presentation system at a video frame rate of the video presentation system. The providing the sets of music features to the video presentation system causes the video presentation system to animate one or more graphical assets based on the provided sets of music features.

15 Claims, 9 Drawing Sheets

(56) References Cited

U.S. PATENT DOCUMENTS

2009/0306797 A1* 12/2009 Cox ................. G06F 17/30743
700/94
2017/0091983 A1* 3/2017 Sebastian ............. G10H 1/0008
2017/0294051 A1* 10/2017 Harviainen ........... G06T 13/205

* cited by examiner

VIRTUAL MUSIC EXPERIENCES

PRIORITY CLAIM

This application claims the benefit of U.S. Provisional No. 62/373,339, filed Aug. 10, 2016, the entire contents of which is hereby incorporated by reference as if fully set forth herein.

TECHNICAL FIELD

The present invention relates to real-time computing platforms for the creation of virtual music experiences and more specifically, to computing platforms that enable the real-time visualization, manipulation, interaction, and creation of music within computer generated virtual environments.

BACKGROUND

When most people think of music, they typically think of experiencing it only in an auditory manner. Of course, the long history of musical accompaniment to visual media such as movies, television, and computer games demonstrates that people enjoy experiencing music in conjunction with a visual presentation. In the realm of digital music, computer music visualization systems exist for generating animated imagery in real-time for a piece of music. Existing music visualization systems are typically configured with preset animation parameters that are adjusted in real-time in response to changes in basic properties of an input piece of music such as the music's loudness and frequency spectrum Traditionally, commercial music has been released in stereo format. Typically, music producers and artists write, record, or synthesize different layers of audio on a multitrack hardware or software system. Once the composition is finished, a mixed mono or stereo track is exported, where all instruments and elements are now mixed at the signal level. Optionally, the mixed mono or stereo track can go through a mastering process, which will also output a processed mono or stereo mix.

Although the stereo format has been massively adopted for listening purposes, it has certain limitations. One limitation is that once layers/sources have been mixed, it is generally not possible to listen to an isolated element from the original composition because the source audio elements overlap in the mixed time domain signal and often in the corresponding frequency domain as well. Audio equalizers have traditionally been used to emphasize or attenuate certain source elements in the underlying mix, but with limitations in terms of the audible results.

Basic visualization of certain features from the different elements or sources in a music mix have been developed over the years. For example, one can still achieve some degree of discrimination and create visualizations of the instantaneous energy present at different frequency bands within a mix. Since certain musical instruments concentrate most of their energy in specific regions within the frequency spectrum, creation of basic visualizations that appear to respond to individual elements or sources within the mix are possible. An example of a basic visualization is an EQ visualization as depicted in FIG. 9. As shown, colors in the EQ visualization are assigned to different frequency bands and the instantaneous energy computed at each frequency band is represented by the height of some vertical bars. However, the source element discriminations involved in basic visualizations typically are not very precise and typically do not involve precise identification of the underlying sources in the input audio mix to create the visuals. With current visualization techniques, it is generally not possible to create precise visualization using features that corresponding to individual audio sources within a digital music input mix.

The approaches described in this section are approached that could be pursued, but not necessarily approached that have been previously conceived or pursued. Therefore, unless otherwise indicated, it should not be assumed that any of the approached described in this section qualify as prior art merely by their inclusion in this section.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
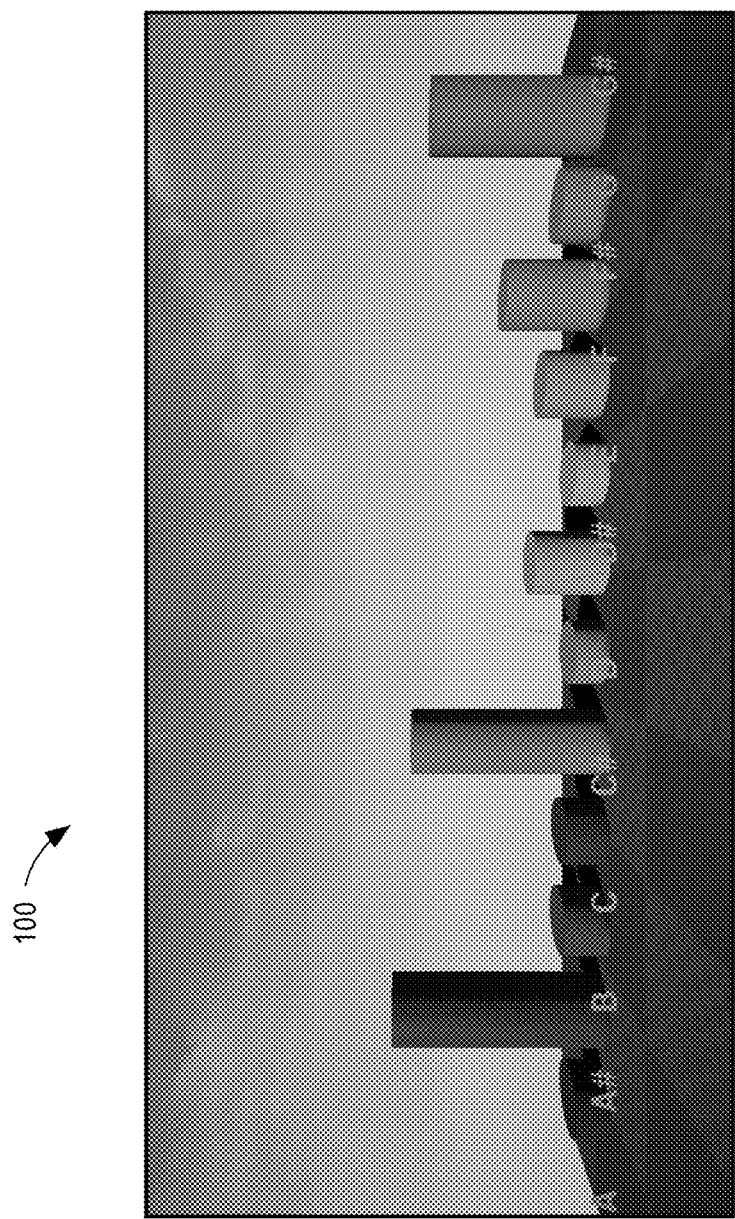
FIG. 1 is a screenshot of the video portion of an example virtual music experience according to some implementations of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

Overview

Two-dimensional (2D) or three-dimensional (3D) real-time content creation/authoring/display platforms/engines, such as gaming engines, exist today for creating immersive computer-generated visual experiences. In the case of gaming engines, these typically include a rendering engine for two-dimensional (2D) or three-dimensional (3D) graphics, a physics engine, sound effects, scripting, animation, artificial intelligence, networking, streaming, memory management, threading, localization support, scene graph, video support for cinematics, etc. A current example of a widely-used gaming engine for creating video games for a variety of different computing platforms is the Unreal Engine 4 available from Epic Games of Cary, N.C. While gaming engines are often used for commercial video game development, they are also used for developing other types of applications such as, for example, virtual reality, education, film, and architecture applications.

Unfortunately, existing platforms do not provide a convenient way to create virtual music experiences in which objects contained in a virtual world visibly respond in real time to different aspects of a digital music input. Techniques shall be described hereafter for more easily creating virtual music experiences. In one implementation, a virtual music experience creation tool with a node-based user interface is provided. By interacting with the node-based interface, the user can graphically connect various musical features (e.g., amplitude, onsets, notes, mood, etc.) to various parameterized visual properties of an object (e.g., color, height, shape, etc.) to create an "audio life form." At runtime, the connected visual properties of the audio life form visibly respond to changes in value of the connected musical features extracted in real time from a digital music input.

Techniques shall also be described hereafter for using real-time audio source separation techniques to deconstruct the digital music input into underlying audio sources to create visualizations using features extracted from each of the separated audio sources. The digital music input can be file-based, stream-based, or a digital recording of a live performance. For example, with the techniques, a digital music input encompassing a stereo mix can be deconstructed in real-time into rhythm, bass, melody, and lead tracks. These tracks may be further deconstructed into additional elements, resulting in a hierarchical decomposition of the original stereo mix. The additional elements may include, for example, the bass drum onsets of the rhythm track. Features and elements of separated sources can be extracted from the reconstructed source's time domain signal or can be extracted from the deconstruction process directly.

For example, the techniques may encompass hierarchical deconstruction of a digital music input including the extraction of rhythmic labeled onsets. Given a digital music input, audio source separation techniques are employed to first deconstruct the input into rhythm, bass, melody, and lead tracks. Audio source separation techniques may then be applied again to the rhythm track to further deconstruct the track into kick drum, snare drum, and hi-hat sub-tracks. In some implementations, the labeled onsets may be extracted directly from the decomposed spectrum of the separated rhythm track, without the need to reconstruct the corresponding time domain signals.

The techniques encompass creating rich visualizations from features extracted from a source separated digital music input. By augmenting the experience of music listening with a rich coherent visual representation, the techniques create a more connected, immersive, and emotional experience for a participant in the virtual music experience.

Virtual Music Experiences

Techniques are described hereafter for creating virtual music experiences using a node-based editor. A virtual music experience may include music output by audio speakers and computer-generated animated visuals displayed on a video display. Preferably, the visuals visibly respond to the music such that visuals appear to be dancing to, choreographed to, or driven by the music.

As one example, a virtual music experience might encompass a virtual reality world depicting an underwater dance club where the participant has the sense they are underwater with various sea creatures. In this world, an audio life form might appear as a jellyfish in which the bell of the jellyfish pulsates to the primary beat of an input digital music track the participant has selected. Additionally, the tentacles of the jellyfish may correspond to different music notes and may change colors as different notes are played in the music track. This is just one example of a possible virtual music experience that may be created using the techniques.

A virtual music experience can be presented on a variety of different audio and visual (A/V) platforms. The A/V presentation platform can be, but is not limed to, a mobile game platform such as, for example, an ANDROID-based or IOS-based mobile game platform. As another example, the A/V presentation platform can be, but is not limited to, a virtual reality platform such as, for example, a SAMSUNG GEAR, HTC VIVE, OCULUS RIFT, STREAMVR, or GOOGLE VR-based virtual reality platform. Other types of A/V presentation platforms are possible and the techniques described herein are not limited to any A/V presentation platform or any A/V presentation platform.

In some implementations of the present invention, a virtual music experience is interactive. For example, using user input devices of the A/V presentation platform, the participant may interact with an audio life form. The interaction may cause a corresponding real-time change in the output music. For example, an audio life form in a three-dimensional virtual reality world may represent a vocal track of an input music track. A positional change of the audio life form within the virtual world caused by user input may, per some implementations of the present invention, cause a corresponding positional audio change in the output of the vocal track such that the vocal track sounds to the participant if it is emanating from the new position in the virtual world of the audio life form.

User input directed to audio life forms may cause more than just real time positional audio changes. For example, user input directed to audio life forms may accomplish real-time audio mixing functions such as, for example, affecting the audio level, the frequency response, or the time domain of the input music. For example, user input directed to an audio life form representing a track of the input music may change the setting of a mixer control that is the applied to the track and thereby cause a corresponding real-time audible change in the track output. For example, the mixer control could be a fader, a pan pot, a compressor, an expander, a limiter, an equalizer, a filter, reverb, etc. The audible change may also be reflected in the visual appearance of the audio life form. Thus, the user's input directed to the audio life form causes both an audible change in the audio track and a visible change in the audio life form that reflects the audible change in the track, thereby completing a real-time feedback loop from both an auditory and visual perspective.

The participant may provide the user input in a variety of different manners depending on the capabilities of the A/V presentation platform presenting the virtual music experience. For example, if the A/V presentation platform is a portable electronic device such as, for example, a smartphone, then the participant may provide user input by performance of touch gestures directed to a touch sensitive display of the device, or by changing the position or orientation of the device. As another example, if the A/V presentation platform is a desktop or laptop computer, then the participant may provide user input by using a keyboard or pointing device (e.g., a mouse). Yet another example, if the A/V presentation platform is a set-top video game console, then the participant may provide user input using a game controller. Yet another example, if the A/V presentation platform is a virtual reality platform, then participant may provide user input with head movement and/or three-dimensional controllers held in the participant's hands.

In some implementations, user input affecting the auditory and visual experience is directed to the input audio instead of an audio life form. In this case, the user input may be independent of the user input capabilities of the A/V presentation platform. Returning to the example in the previous paragraph, per techniques of the present invention, instead of using a user input device (e.g., game controllers or virtual reality controllers) of the A/V presentation platform to provide user input directed to an audio life form, a music disc jockey (DJ) could adjust a mixer control of an audio mixing device which causes an audible change in an audio track and a corresponding visible change in the audio life form representing the audio track.

In some implementations of the present invention, the virtual experience may have an editing mode. In the editing mode, a participant can import or drag and drop an audio life form into a virtual experience. For example, the participant may have previously purchased or downloaded the audio life form from an online store. Visual properties of the audio life form may be configurable by the participant within the virtual experience. Such configuration may be accomplished using user input directed to graphical user interface elements such as drop down menus, check boxes, or other GUI elements. For example, returning the underwater dance club example, the participant may have purchased a virtual music experience extension or plugin representing the jellyfish audio life form. The participant may import the jellyfish audio life form into the underwater dance club virtual experience. GUI elements of the visual presentation may allow the participant to select visual properties of the audio life form to match to selected music features. For example, the participant may configure the jellyfish audio life form in the virtual experience such that the bell of the jellyfish visibly responds to the primary beat of the bass audio track and the tentacles of the jellyfish audio life form visibly respond to detected notes in the harmonic audio track.

In some implementations of the present invention, a virtual music experience is creative. For example, a participant may perform different 3D gestures using a provided interface (e.g., virtual reality hand-held controllers) that triggers the creation/synthesis of sounds. For example, the gestures may be performed to play a virtual instrument within the virtual environment such as, for example, a virtual piano, string instrument, percussion instrument, wind instrument, electronic instrument, etc. The generated sounds can in turn drive the visible behavior of an audio life form in the virtual environment.

In some implementations of the present invention, playing the virtual instrument causes a sequence of Musical Instrument Digital Interface (MIDI) messages to be generated and stored. The data in the MIDI message represents the sound of what was played on the virtual instrument by the participant. MIDI encompasses a technical standard that describes a protocol, digital interface and connectors and allows a wide variety of electronic musical instruments, computers and other related devices to connect and communicate with one another. Open Sound Control messages may be used in addition to or as an alternative to MIDI messages. Open Sound Control (OSC) a protocol for networking sound synthesizers, computers, and other multimedia devices for purposes such as musical performance or show control.

Music Features

Per some implementations of the present invention, the participant may select the music to be a part of a virtual music experience. For example, the participant may provide a compressed digital music file or data stream containing a digital music stream encoded in a lossy or lossless audio coding format. For example, the audio coding format of the coded music stream may be, for example, MPEG-1 and/or MPEG-2 Audio Layer III (MP3), Windows Media Audio (WMA), MPEG-4 part 14 (MP4), Advanced Audio Coding (AAC), OGG, Free Lossless Audio Codec (FLAC), Waveform Audio File Format (WAV), etc. The bit rate of the coded music stream may vary between, for example, 320 kilobits per second (kbps) and 1,411 kbps. The sample rate of the coded music stream may vary between, for example, 16,000 Hertz (Hz) and 192,000 Hz. The bit depth of samples in the coded music stream may be, for example, 8 bit, 16-bit, 20-bit, 24-bit, 32-bit floating point, etc. The coded music stream may encode a single channel (mono) or multiple channels (e.g., stereo or surround) of audio. Overall, the techniques described herein are not limited to any audio coding format or particular type of audio coding format or particular audio source. For example, the coded music stream can be captured or fed from a live performance such as a musical concert performance or a music DJ performance. A coded music stream that is input to a virtual music experience is referred to hereafter as the "digital music input."

Per some implementations of the present invention, during presentation of a virtual music experience, a number of music feature values are extracted from the digital music input stream. The music feature values are packaged in data frames and provided to the A/V presentation platform that is presenting the virtual music experience. Data frames may be provided to the A/V presentation platform at a rate corresponding to the video frame rate at which the A/V presentation platform presents the video portion of the virtual music experience. The video frame rate may vary depending on the A/V presentation platform at hand. For example, if the A/V presentation at hand is a virtual reality platform, then the video frame rate may be 90 frames per second (fps) or more. Accordingly, in this case, data frames may be provided to the A/V presentation platform at corresponding rate (e.g., 90 music data frames per second).

The A/V presentation platform uses the music feature values in the data frames it receives to drive the animation of the audio life forms presented as part of the visual portion of the virtual music experience. The A/V presentation platform encompasses animation logic that is defined during an editing process by visual scripting node networks created using a node-based editor.

Per some implementations of the present invention, a visual scripting node network created during the editing process using the node-based editor encompasses a data path from an output of a node representing a musical feature to the input of a node representing a parametrized visual property of an audio life form. At runtime of the virtual music experience, the A/V presentation platform extracts the current value of the musical feature from the current music data frame and provides it as input to the logic defined by the visual scripting node network. The logic is executed by the A/V presentation platform at runtime to process the input.

Such processing produces an input value that changes the visual property parameter and causes the audio life form to visibly exhibit the property parameter change.

While in some implementations a visual scripting node network created during the editing process using the node-based editor encompasses a data path from an output of a node representing a musical feature to an input of a node representing a parametrized visual property of an audio life form, a visual scripting node network, in other implementations, encompasses a data path from an output of a node representing a musical feature to the input of another node representing another musical feature and from an output of that musical feature node to an input of a node representing a parameterized visual property of an audio life form. More generally, a data path to an input of a node representing a parameterized visual property of an audio life form may encompass multiple nodes representing musical features.

While in some implementations the output of a node represents a raw music feature extracted from the digital music input, the output of a node represents a high-level music driven feature that is based on a raw music feature extracted from the digital music input in other implementations. For example, a node may combine a raw music feature extracted from the digital music input with embedded behavior that augments the raw music feature to produce a high-level music feature as output. For example, a node may output gravitational force values that are based on music pitch values extracted from the digital music input. The output of this node may be connected to an input of a node representing a parameterized visual property of an audio life form such that, at runtime, the visual property is driven by the output gravitational force values which in turn driven by the music pitch values extracted from the digital music input.

For example, the audio life form may comprise a three-dimensional object such as a cylindrical shaped object and the parameterized visual property may be the relative z-axis scale of the object in the virtual world. The music feature value input to the A/V presentation platform logic defined by the scripting node network created during the editing process may be, for example, an index identifying one of the 12 distinct semitones (chroma features) of the musical octave. Thus, the participant in the virtual music experience may see the height of the audio life form change as the chroma information is extracted from in the digital music input.

FIG. 1 is a screenshot 100 of the video portion of an example virtual music experience per some implementations of the present invention. In this example, there are twelve audio life forms. In this example, each audio life form has the appearance of a cylinder. However, the visual appearance of an audio life form is not limited to any shape, form, or color and the cylindrical shape is merely one example of a possible shape of an audio life form. Each audio life form in this example corresponds to one of the 12 human-perceptible semitones (chroma) of the musical octave. In this example, after one of the twelve semitones is extracted from the digital music input, the height of the corresponding cylinder instantly increases to a maximum defined height and then more slowly decreases toward an initial height according to a parameter smoother until the same semitone is detected again. Thus, the height of cylinders corresponding to more recently extracted semitones are higher than that of less recently detected semitones. For example, at the instant captured by screenshot 100, the following semitones were extracted from the digital music input in order of most recently extracted to least recently extracted; "A#", "C#", "G#", "F#", "D#", "F", "G".

The chroma is just one example of many possibly music features that may be extracted from the digital music input in real time. Per some implementations, each of the extracted music features are categorized into one of three different music feature levels. Music feature "Level One" encompasses lower-level mathematically derived features from the digital music input such as spectrum, cepstrum, amplitude, envelope, panorama, formants, etc.

Music Feature "Level Two" makes use of Level One music features to extract semantically meaningful information about the digital music such as, for example, notes onsets, notes on the musical scale, labeled onsets, chroma features, individual musical notes with their associated duration, attack and decay patterns, etc. A labeled onset is an onset that identifies the onset of an individual audio source of a track. For example, a labeled onset may identify the onset of a kick drum, a snare drum, or a hi-hat cymbal, or other individual audio source.

Level Two musical features may be extracted from the digital music input using a variety of different techniques. For example, note onsets may be identified using phase and magnitude information about the digital music input signal. Labeled onsets may employ audio source separation techniques to identify onsets of individual instruments or elements within a single, mixed source.

"Level Three" music features including the overall mood of the digital music input such as whether the music is "happy", "sad", "stressful", "intense", etc. These music features may be extracted based on characterizing metadata in the digital music input stream or based on an automatic mood detection analysis technique applied to the digital music input. The automatic mood detection analysis may be based on the Level One and Level Two features extracted from the digital music input.

A music feature may be defined as a calculation of a feature of the digital music input for during a window of time of the digital music input. The calculation may be performed based on information extracted from samples in the window of time of the digital music input. For example, the window may be approximately eleven and half (11½) milliseconds in length corresponding to 512 samples for a digital music input stream coded at 44,100 Hz. For example, the calculation of the average loudness of the samples in a window can be said to be the music feature of "Loudness." Thus, reference to music feature herein may encompass a calculation performed on information extracted from samples within a window of time of the digital music input stream.

Per some implementations of the present invention, audio source separation techniques are applied to the digital music input stream to separate the digital music input stream into multiple tracks and music features are extracted from the separate tracks. For example, the digital music input stream may be source separated into rhythm, bass, melody, and lead track. A rhythm track may encompass recorded drums other percussive elements and synthesized beats. A bass track may encompass bass sounds such as those from a bass guitar and synthesized low frequency melodies. A melody track may encompass sounds from pianos, string instruments, and synthesized melodic and harmonic sounds that are not part of a rhythm or bass track. A lead track may encompass vocals or lead instrument or lead melody that drives the song. A master track (original mono or stereo mixed input) may also be retained to extract features pertinent to the mix itself rather than individual tracks. Music features then, may be extracted for each of the master, rhythm, melody, and lead tracks. Thus, an extracted music feature may be specific to a track (e.g., master, rhythm, bass, melody, or lead).

Per some implementations, as well as being specific to a particular track, an extracted music feature is also specific to a particular channel within the particular track. For example, for a stereo digital music input, each of the master, rhythm, bass, melody, and lead tracks may have a left channel and a right channel. In this case, an extracted music feature may be for a channel of a track.

Rendering Audio Life Forms

Per some implementations of the present invention, the techniques disclosed herein allow a user to create an audio life form. An audio life form may be defined generally as a 2D or 3D computer generated asset that visually reacts in real time, in response to one or a combination of features extracted from the digital music input. The asset can take a variety of different shapes, sizes, forms, and colors with different textures and meshes. An asset can also be a point cloud resulting from an off-line 3D-scanned object from the real world or the result of a streamed real-time 3D capture. The parameterized visual properties of an audio life form (e.g., color, height, shape, etc.) driven by the music features extracted from the digital music input create and determine the behavior of the audio life form. Display of the asset may be driven by the A/V presentation platform.

The computer animation may be accomplished by the A/V presentation platform in a variety of different ways and the techniques disclosed herein are not limited to any rendering technique. For example, the A/V presentation platform may employ one or more shaders to render an audio life form. In this context, a shader generally refers to a computer graphics program that runs on a graphics processor (GPU) as part of a graphics rendering pipeline. There are different types of shaders, any one or more of which may be used in a rendering pipeline. The different types of shares include vertex shaders, tessellation control and evaluation shaders, geometry shaders, fragment shaders, computer shaders, etc.

Audio life forms may also be rendered by the A/V presentation platform in a procedural manner. For example, the audio life form may comprise a particle system that is rendered via procedural animation techniques. The animation of the particle system may change because of changes in the digital music input. As another example, an audio life form may be procedurally generated. Inputs to the procedural generation function may varied based on extracted changes in the digital music input.

In some implementations, an audio life form can be automatically generated by an AI (Artificial Intelligence) component that, based on characteristics and features from the digital music input, determines the most coherent and meaningful mappings between the features extracted from the input audio and the visual parameters to be affected in the audio life form.

In some implementations, an image/object recognition module automatically creates a skeleton structure (rig) for an arbitrary 3D graphical asset brought/imported to the editing environment, applies geometric and physical constraints to the 3D asset and exposes the relevant parameters to be driven by music features, therefore converting an unanimated 3D graphical asset into an audio life form automatically. Thus, an audio life form can be created by a user, by taking an unanimated 3D asset, exposing certain visual properties/parameters and connecting these to specific features extracted from the music. In addition, or alternatively, an audio life form asset may be brought into the authoring environment. In addition, or alternatively, an online marketplace may allow users to share, sell, and distribute audio life form assets or virtual environments. Such assets and virtual environments may encompass 3D graphical assets with pre-encoded behavior that encapsulates music feature to visual property parameter mapping.

Node-Based Interface

A 2D or 3D real-time content creation/authoring/display engine may provide a node-based interface for visually scripting behavior of a virtual world of a virtual music experience. For example, the node-based interface may allow the user to create and edit visual scripting node networks that define the behavior without the user having to author instructions in a low-level programming language. Nodes in a network may represent events, function calls, flow control operations, variables, etc. that can be used in graphs to define the functionality of the graph and the visual scripting node network that contains the node. In the Unreal Engine 4, for example, the visual scripting node networks are referred to as "blueprints."

Using the node-based interface, the user may add, remove, edit, and move different types of nodes. The user may also connect nodes together using wires. A "wire" can represent the flow of execution from one node to another or represent the flow of data from one node to another depending on the type of node pins the wire is connected to. A "pin" can be associated with a node. A pin can be an input pin or an output pin. An input pin may appear in the node-based editor on the left side of the node while an output pin may appear on the right side of the node. A pin can also be an execution pin or a data pin. An input execution pin of a node can be activated to execute the node. When execution of the node is complete, the output execution pin of the node is activated to continue the flow of execution. An input data pin of a node can be for taking data into the node. And an output data pin of the node can be for outputting data from the node.

The terms "node," "pin," and "wire" are based on the node-based editor provided by Unreal Engine 4. However, the Unreal Engine 4 is merely one example of an engine that may provide a node-based editor. Other types of engines may provide a node-based editor that uses differently terminology for the same or equivalent concepts. The techniques described herein are not limited to any engine or any particular type of node-based editor.

Per some implementations of the present invention, a user is presented with an interface that represents a graph. Through interaction with the user interface, the user specifies music features that are to drive the animation of selected visual properties during runtime of a virtual music experience. At runtime, during presentation of the virtual music experience, the selected visual properties are animated in accordance the specified music features extracted from the digital music input.

Figure 2:
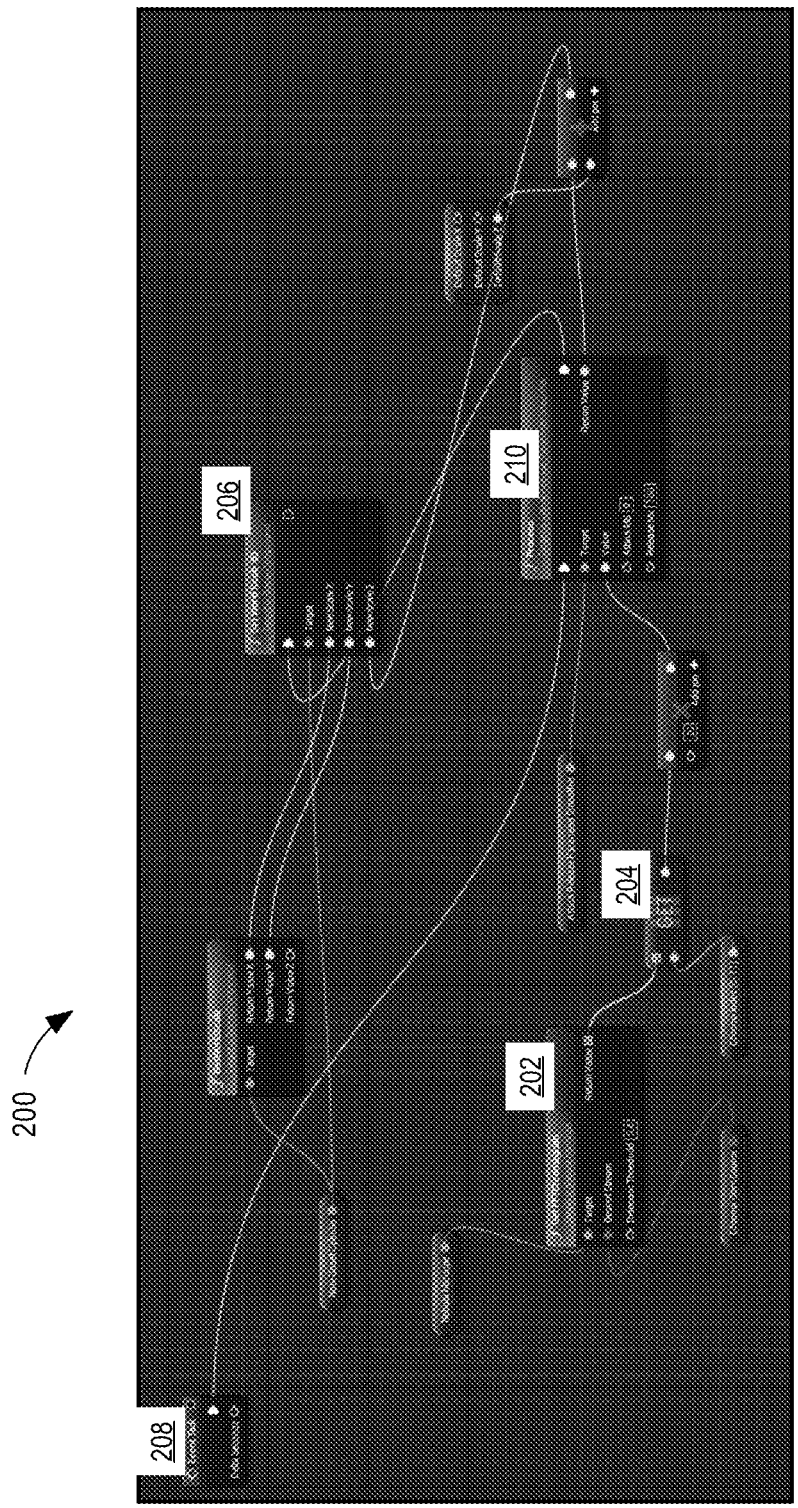
FIG. 2 is a screenshot of a node-based interface for creating a virtual music experience according to some implementations of the present invention.

Per some implementations of the present invention, the node-based interface supports several music features, including, but not limited to, a Fast Fourier Transform (FFT) Chromagram music feature and a Note Onsets music feature. FIG. 2 is an example of a node-based interface supporting the FFT Chromagram music feature. With the FFT Chromagram music feature, a visual depiction of the music feature is generated. In the implementation depicted in FIG. 2, the visual depiction is a rectangular node with a title "Get FFTChromagram" and having three input pins labeled "Target," "Desired Stream," and "Detection Threshold." and one output pin labeled "Return Value." In alternative implementation, the visual depiction associated with the music feature may differ. For example, the music feature may be depicted with a square, a circle, or other geometric shape. The techniques described herein are not limited to any way to visual depict music features.

Figure 3:
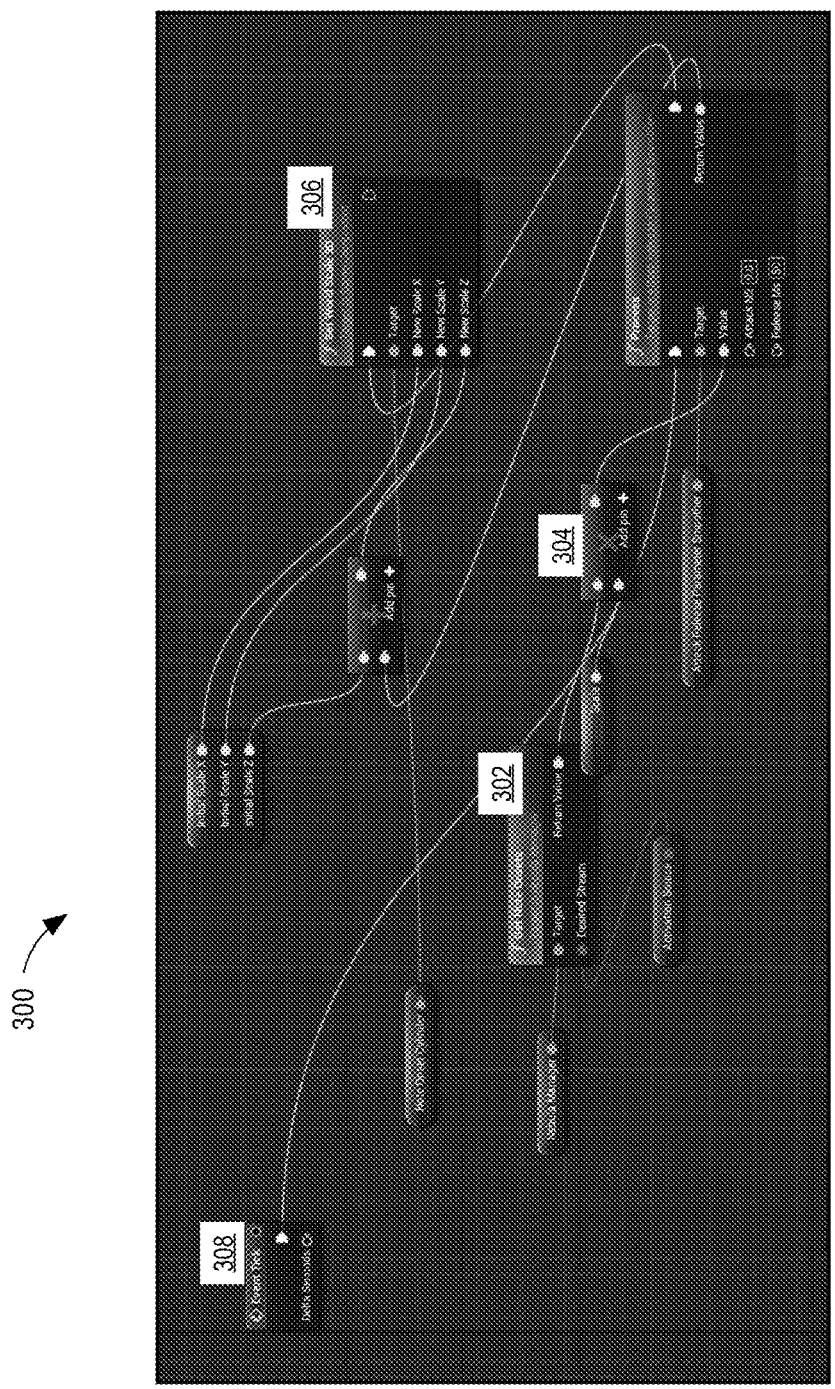
FIG. 3 is another screenshot of a node-based interface for creating a virtual music experience according to some implementations of the present invention.

FIG. 3 is an example of a node-based interface supporting the Note Onsets music feature. With the Note Onsets music feature, a visual depiction of the music feature is generated with the inputs and output specific to the music feature. In the implementation depicted in FIG. 3, the visual depiction does not include the "Detection Threshold" input pin like the visual depiction for the FFT Chromagram music feature because that input is not available for the Note Onsets music feature. However, like the visual depiction of the FFT Chromagram music feature, the visual depiction of the Note Onsets music features includes an input pint labeled "Desired Stream." In accordance with some implementations of the present invention, the "Desired Stream" input selects at runtime one of the four source separated tracks (e.g., rhythm, bass, melody, and lead) or the master track of the digital music input from which the Note Onsets music feature is extracted and provided as the "Return Value" output pin. In the depicted implementation, the labels for the input and output pins are intended to be descriptive of the pin function. However, as with the visual depiction of the music features, the pin labels may vary from implementation to implementation.

Using the Node-Based Interface to Connect a Music Feature to a Visual Property

According some implementations of the present invention, the visual depiction of a music feature includes an output pin that may be connected directly to an input pin of another node via a wire. For example, in the implementation depicted in FIG. 2, by interacting with the node-based interface, the user has directly connected via a wire the "Return Value" output data pin of FFT Chromagram music feature node 202 to an input data pin of Get node 204. Specifically, in this example, the user using a pointing device (e.g., a mouse) has dragged and dropped the wire between the pins. However, the pins may be directly connected using other manner of user input such as, for example, by selecting one of the two pins with a first user input (e.g., a first mouse click) and then selecting the other of the two pins with a subsequent user input (e.g., a subsequent mouse click). The techniques described herein are not limited to any way to directly connect an output pin of one node to an input pin of another node.

Referring to the implementation depicted in FIG. 2, at runtime, the return value of the A/V presentation platform logic implementing the FFT Chromagram music feature node 202 is an array of FFT chromagram values corresponding to the 12 semitones (chroma) extracted from the selected music track of the digital music input. The array of chromagram values is input to A/V presentation platform logic implementing the get node 204. The output of the logic implementing the get node 204 is one of the twelve FFT chromagram values selected by an input index value corresponding to one of the twelve audio life forms shown in screenshot 100 of FIG. 1.

Similarly, for the Note Onsets music feature, as shown in FIG. 3, the user has directly connected via a wire the "Return Value" output data pin of Node Onsets music feature node 302 to an input data pin of Multiply node 304.

Referring to the implementation depicted in FIG. 3, at runtime, the return value of the A/V presentation platform logic implementing the Node Onsets music feature node 302 is a numerical value extracted from the selected music track of the digital music input. The numerical value is input to A/V presentation platform logic implemented the multiply node 304. The output of the logic implementing the multiple node 304 is a numerical value reflecting the multiplication of the input numerical value output by the logic implementing the Node Onsets music feature node and an input scale factor.

By interacting with the node-based interface, the user can indirectly connect via a set of wires and one or more intermediate nodes, an output data pin of a music feature node to an input data pin representing a visual property of an audio life form. Referring to the implementation depicted in FIG. 2, the audio life form has the appearance of a three-dimensional cylinder and the visual property is the height (z-axis) of the cylinder relative to the virtual world scale. The visual property corresponds to the input data pin labeled "NewScaleZ" of node 206.

Similarly, referring to the implementation depicted in FIG. 3, the audio life form also has the appearance of a three-dimensional cylinder and the visual property is also the height (z-axis) of the cylinder relative to the virtual world. The visual property corresponds to the input data pin labeled "NewScaleZ" of node 306. Specifically, in the implementation depicted in FIG. 3, by interacting with the node-based interface, the user has indirectly connected via a set of wires and intermediate nodes, the output data pin of the Node Onsets music feature node 302 to the "NewScaleZ" input pin of node 306.

Event Tick

A node graph in the node-based interface that includes a musical feature node may also include a node that represents the runtime clock of the A/V presentation platform. For example, in the implementation depict in FIG. 2, the node graph includes event tick node 208. In this example, the output execution flow pin of the event tick node 208 is connected to the input execution flow control pin of process node 210. At runtime, on an event tick, the logic implementing process node 210 is executed based on the current FFT chromagram music feature value produced by the logic implementing the music feature extraction. How the event tick integrates with the logic implementing the music feature extraction is described in greater detail in the next section.

Virtual Music Experience Runtime System

Figure 4:
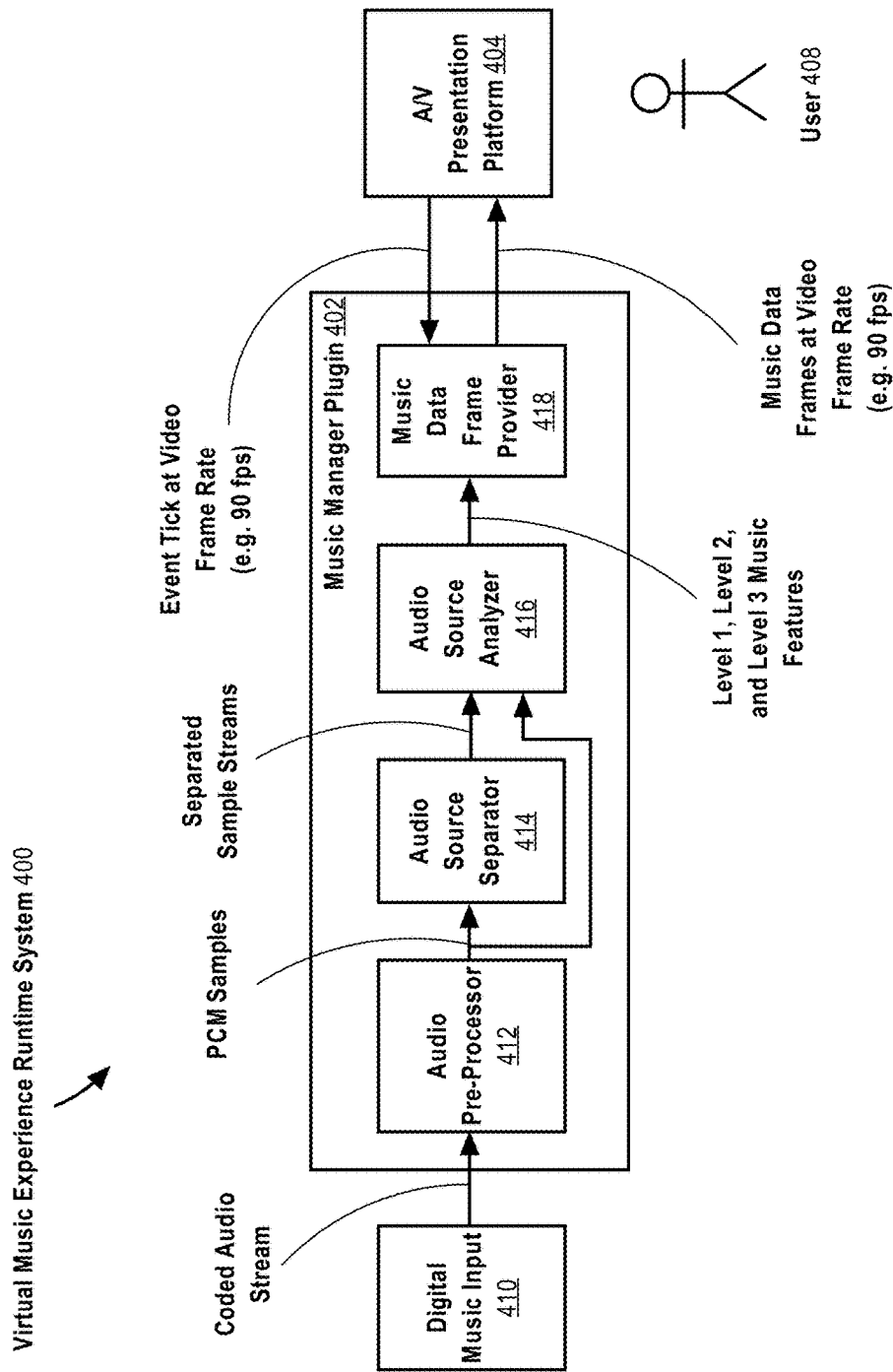
FIG. 4 depicts a virtual music experience runtime system according to some implementations of the present invention.

Turning now to FIG. 4, it schematically depicts a virtual music experience runtime system 400 per some implementations of the present invention. The system 400 includes a music manager plugin/interface 402 to an A/V presentation platform 404 where audio and video content generated is presented to a user 408.

The music manager plugin 402 may interface with the A/V presentation platform 404 via an application programming interface (API) offered by the A/V presentation platform 404. Preferably, the API allows the music manager plugin 402 to receive a notification (data message) referred to herein as an "event tick." For example, the event tick may be received by the plugin 402 via a callback function that the plugin 402 registers with the A/V presentation platform 404 at plugin 402 startup, initialization, or load. Preferably, the plugin 402 receives an event tick from the A/V presentation platform 404 at a rate that is equal to, or substantially equal to, the video frame rate of the A/V presentation platform 404. For example, if the A/V presentation platform 404 is a virtual reality platform, then the video frame rate may be on average upwards of 90 frames per second or more. Accordingly, in this case, the plugin 402 may receive an event tick from the A/V presentation platform 404 at that rate. It should be noted that the video frame rate may fluctuate over time during a presentation and may not remain constant during the presentation. As such, the rate at which the plugin 402 receives event ticks from the A/V presentation platform 404 may also fluctuate during the presentation as the video frame rate fluctuates.

In some implementations, the API takes the form of a local software interface such as, for example, a stand-alone engine running on the same computing device as the A/V presentation platform. Alternatively, the API may be a Web API running on the cloud, sending the data to a remote client through different technologies such as, for example, a traditional request-response web service or a web-sockets implementation. In this configuration, the client device may receive data from the cloud-located portion of the A/V presentation platform for presenting the music visual experience at the client device.

Upon receiving an event tick from the A/V presentation platform 404, the plugin 402 provides a music data frame to the A/V presentation platform 404 via the API. The music data frame contains a wealth of low-level and high-level music features extracted by the plugin 402 from a source digital music input 410. Upon receiving the music data frame, the A/V presentation platform 404 executes the logic created during the editing processing and providing as input to the logic the music features corresponding to the music feature nodes included in the node graph created using the node-based interface as described an example above.

As mentioned, the digital music input 410 may be selected by the user 408. The music manager plugin 402 is configured to extract various music features that is provided in music data frames to the A/V presentation platform 404 in real-time. To do this, the plugin 402 includes an audio pre-processor 412, an audio source separator 414, an audio source analyzer 416, and a music data frame provider 418.

The audio pre-processor 412 decodes the digital music input stream 410 into a stream of pulse-code modulation (PCM) samples.

The audio source separator 414 separates (i.e., de-mixes) the input PCM sample stream into multiple source separated PCM sample streams. In accordance with some implementations of the present invention, four source separate sample streams are produced by the audio source separator 414. The four streams include a rhythm track, a bass track, a melody track, and a lead track. A variety of different techniques may be employed by the audio source separator 414 to separate the input sample stream into the separate tracks. The present invention is not limited to any audio source separation technique. One audio source separation technique that may be employed by the audio source separator 414 is the real-time audio source separation techniques described in U.S. Provisional Patent Application No. 62/295,497, entitled "Semantic Equalization," filed Feb. 16, 2016, the entire contents of which is hereby incorporated by reference as if fully set forth herein. However, other source separation techniques may be employed by the audio source separator 414. For example, the audio source separator 414 may separate the input PCM sample stream into the four tracks based on the spectral diversity of the individual sound sources. The spectral diversity may be learned from relevant training data to separate them from the input sample stream. The supervised learning may be based on non-negative matrix Factorization (NMF) or probabilistic latent component analysis, for example.

While in some implementations, the audio source separator 414 outputs four (4) tracks, the audio source separator outputs fewer or more tracks in other implementations. Generally, the audio source separator 414 is not limited to outputting only one or more of a rhythm track, a bass track, a melody track, or a lead track.

In some implementations, the digital music input 410 is provided in a pre-source separated format. One example of a pre-source separate format is the STEMS format developed by Native Instruments of Berlin, Germany. In this case, the plugin 402 may not execute the audio source separator 414. However, it still may include the audio pre-processor 412 for decoding the individual source separated tracks in the digital music input 410 into PCM sample streams that are provided to the audio source analyzer 416. The STEMS format is just one example of a format containing pre-source separated music tracks that can be used as input to the system, as well as the number of tracks that can be fed into the system. The system is not limited to operating with only four (4) tracks and can operator with any multi-track input in terms of number of tracks and name designation for each one.

The separated tracks and the unseparated master track are fed to an audio source analyzer 416. The audio source analyzer 416 extracts music features from each of the five tracks. The extracted music features are then packaged into a music data frame by the music data frame provider 418. The music data frame provider 418 provides the current music data frame to the A/V presentation platform 404 at the next event tick. The music data frame generally is a data structure containing the extracted music features on a per-track and/or per-channel (left, right, mid) basis. Thus, the music data frame may contain a separate set of extracted music features for the rhythm track, the bass track, the melody track, the lead track, and the master track.

Labeled Onset Example

Figure 5:
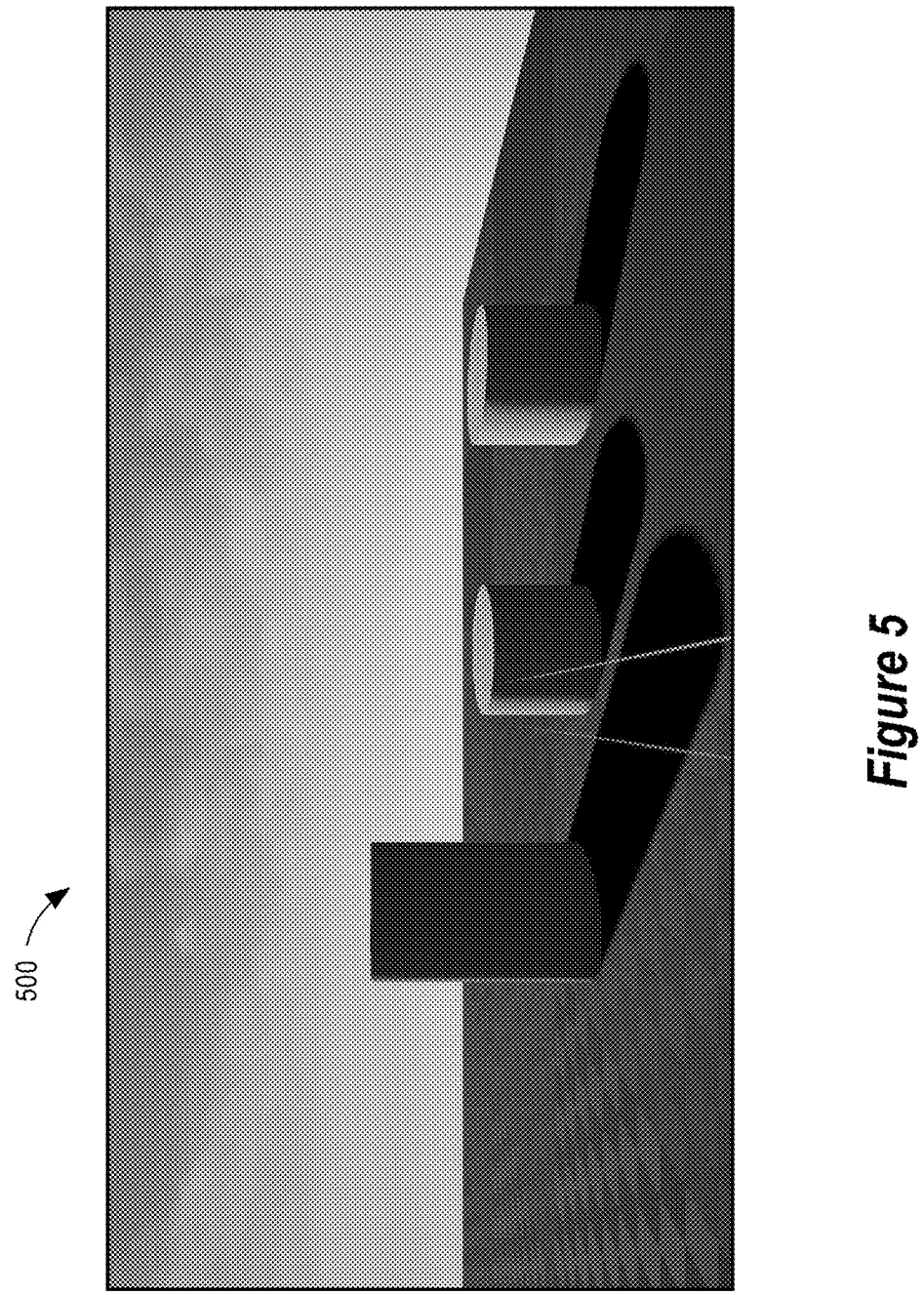
FIG. 5 is a screenshot of a virtual music experience that uses labeled onset music features extracted from the digital music input to animate audio life forms according to some implementations of the present invention.

FIG. 5 is a screenshot 500 of a virtual music experience that uses labeled onset music features extracted from the digital music input to animate audio life forms. The virtual music experience is generated using techniques disclosed herein. A labeled onset is a music feature representing the onsets of individual instruments or elements within a single, mixed source. For example, a labeled onset music feature may be extracted from the digital music input every time the bass drum is struck or every time the snare drum is hit. In the example depicted in FIG. 5, each of the audio life forms has the appearance of a cylinder. Like the example depicted in FIG. 5, the cylinder height is animated up and down when a corresponding music feature (the onset) is extracted from the digital music input. However, instead of the animation occurring when a semitone is extracted, the cylinder height attacks to a maximum defined height when a labeled onset is extracted. For example, each of the audio life form may correspond to a different labeled onset for a percussive instrument such as, for example, a snare drum, a bass drum, or a floor tom. When one of the labeled onsets is extracted from the digital music input, it is provided to the A/V presentation platform as a music feature which causes the animation of the corresponding cylinder to animate accordingly.

In some embodiments, labeled onsets are detected at runtime via a hierarchical audio source separation technique.

Specifically, a first hierarchical level involves source separating the digital music input into multiple individual tracks such as a bass track, a rhythm track, a melody track, and lead track. A second hierarchical level involves source separating each of the multiple individual tracks into multiple individual track-specific source tracks. For example, a rhythm track may be source separated into a bass drum track, a kick-drum track, and a hi-hat track. Onsets may be detected from each of the individual track-specific source tracks and provided as music features to the A/V presentation system. Each such music feature may include a label or tag that identifies the track-specific source track the onset is detected from.

Particle System Example

Figure 6:
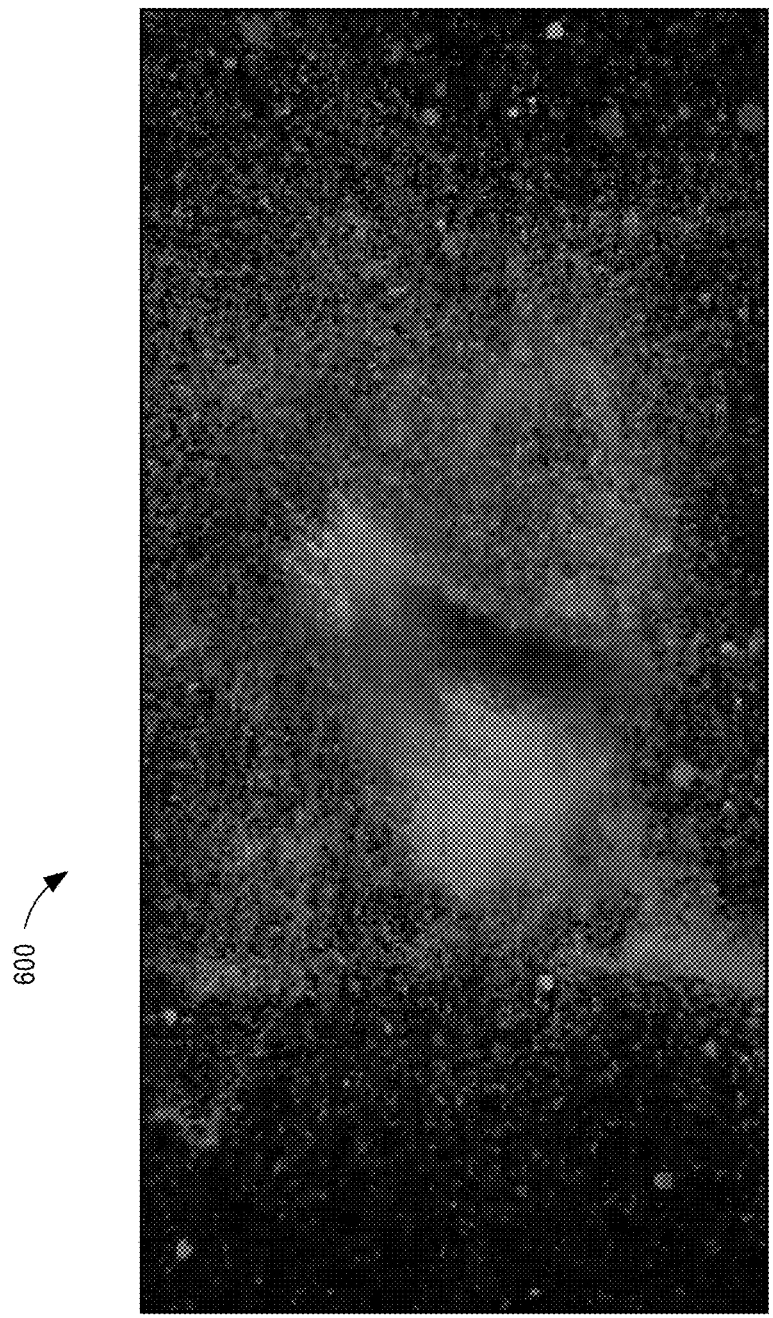
FIG. 6 is a screenshot of a virtual music experience that uses various music features extracted from the digital music input to animate audio life forms according to some implementations of the present invention.

FIG. 6 is a screenshot 600 of a virtual music experience that uses various music features extracted from the digital music input to animate an audio life form. The virtual music experience is generated using techniques disclosed herein. In this example, the audio life form is a particle system. In the example depicted in FIG. 6, the visual properties of the particle system driven by music features extracted from the digital music input include environmental parameters such as gravity, attractors, pulsations that affect the movement of the particles in the system. Other possible visual properties include individual color and size. Thus, as well as the entire particle system being an audio life form, the individual particles of the system can be configured as audio life forms as well using the techniques disclosed herein.

Basic Computing Device

Figure 7:
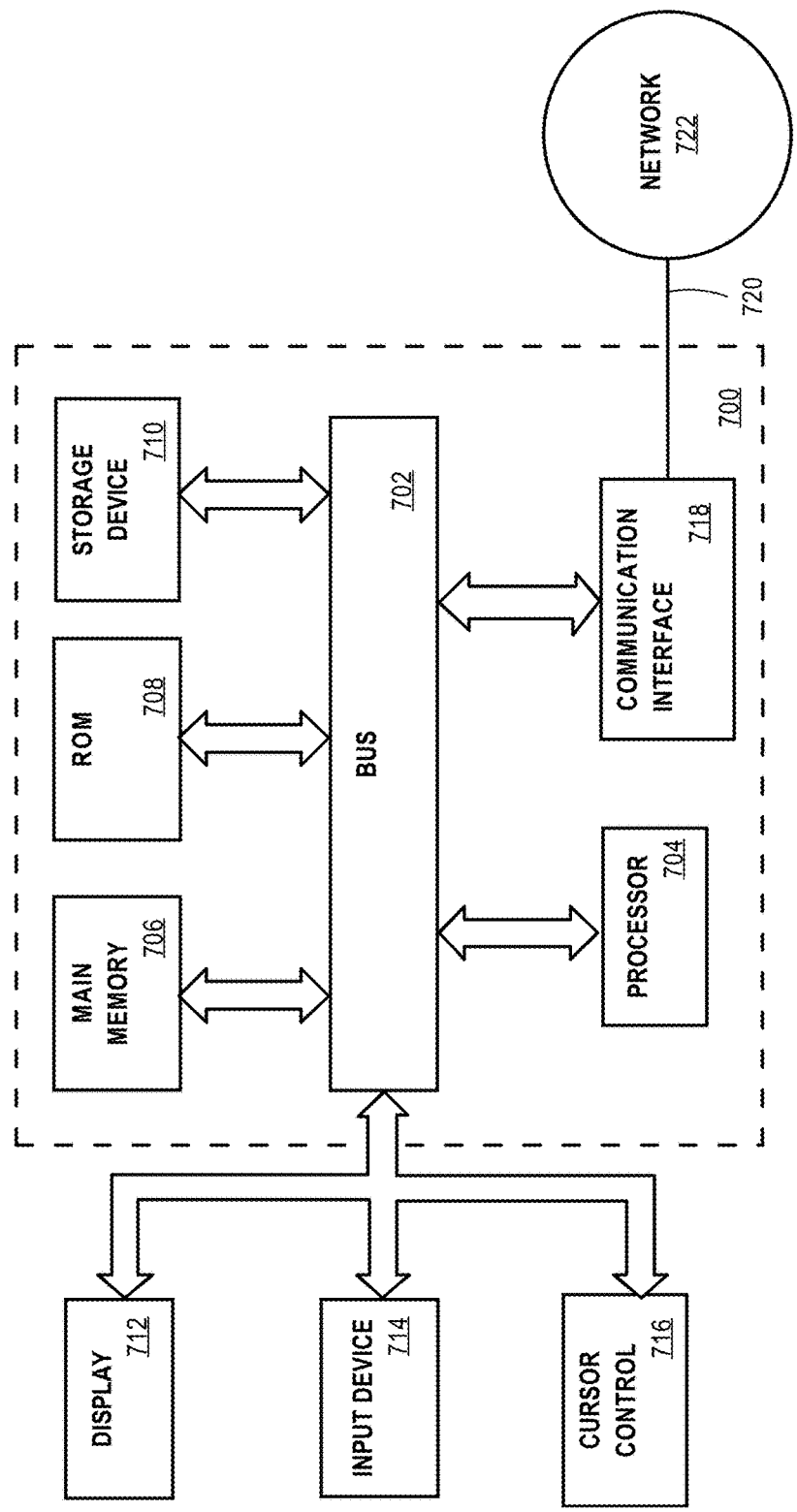
FIG. 7 is a block diagram that illustrates a basic computing device in which the implementations of the present invention may be embodied.

Referring now to FIG. 7, it is a block diagram that illustrates a basic computing device 700 in which the example embodiment(s) of the present invention may be embodied. Computing device 700 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions. Techniques and methods disclosed herein may be implemented or performed by a computing system comprising one or more computing devices like computing device 700. Each computing device of the computing system may be configured with a software system for controlling the operation of the computing device like software system 800 described below with respect to FIG. 8.

Computing device 700 may include a bus 702 or other communication mechanism for addressing main memory 706 and for transferring data between and among the various components of device 700.

Computing device 700 may also include one or more hardware processors 704 coupled with bus 702 for processing information. A hardware processor 704 may be a general-purpose microprocessor, a system on a chip (SoC), or other processor.

Main memory 706, such as a random-access memory (RAM) or other dynamic storage device, also may be coupled to bus 702 for storing information and software instructions to be executed by processor(s) 704. Main memory 706 also may be used for storing temporary variables or other intermediate information during execution of software instructions to be executed by processor(s) 704.

Software instructions, when stored in storage media accessible to processor(s) 704, render computing device 700 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 700 also may include read only memory (ROM) 708 or other static storage device coupled to bus 702 for storing static information and software instructions for processor(s) 704.

One or more mass storage devices 710 may be coupled to bus 702 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 710 (e.g., the main hard disk for the device) stores a body of program and data for directing operation of the computing device, including an operating system, user application programs, driver and other support files, as well as other data files of all sorts.

Computing device 700 may be coupled via bus 702 to display 712, such as a liquid crystal display (LCD) or other electronic visual display, for displaying information to a computer user. In some configurations, a touch sensitive surface incorporating touch detection technology (e.g., resistive, capacitive, etc.) may be overlaid on display 712 to form a touch sensitive display for communicating touch gesture (e.g., finger or stylus) input to processor(s) 704.

An input device 714, including alphanumeric and other keys, may be coupled to bus 702 for communicating information and command selections to processor 704. In addition to or instead of alphanumeric and other keys, input device 714 may include one or more physical buttons or switches such as, for example, a power (on/off) button, a "home" button, volume control buttons, or the like.

Another type of user input device may be a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

While in some configurations, such as the configuration depicted in FIG. 7, one or more of display 712, input device 714, and cursor control 716 are external components (i.e., peripheral devices) of computing device 700, some or all of display 712, input device 714, and cursor control 716 are integrated as part of the form factor of computing device 700 in other configurations.

Functions of the disclosed systems, methods, and modules may be performed by computing device 700 in response to processor(s) 704 executing one or more programs of software instructions contained in main memory 706. Such software instructions may be read into main memory 706 from another storage medium, such as storage device(s) 710. Execution of the software instructions contained in main memory 706 cause processor(s) 704 to perform the functions of the example embodiment(s).

While functions and operations of the example embodiment(s) may be implemented entirely with software instructions, hard-wired or programmable circuitry of computing device 700 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more software instructions to processor(s) 704 for execution. For example, the software instructions may initially be carried on a magnetic disk or solid-state drive of a remote computer. The remote computer can load the software instructions into its dynamic memory and send the software instructions over a telephone line using a modem. A modem local to computing device 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor(s) 704 retrieves and executes the software instructions. The software instructions received by main memory 706 may optionally be stored on storage device(s) 710 either before or after execution by processor(s) 704.

Computing device 700 also may include one or more communication interface(s) 718 coupled to bus 702. A communication interface 718 provides a two-way data communication coupling to a wired or wireless network link 720 that is connected to a local network 722 (e.g., Ethernet network, Wireless Local Area Network, cellular phone network, Bluetooth wireless network, or the like). Communication interface 718 sends and receives electrical, electromagnetic, or optical signals that carry digital data streams representing various types of information. For example, communication interface 718 may be a wired network interface card, a wireless network interface card with an integrated radio antenna, or a modem (e.g., ISDN, DSL, or cable modem).

Network link(s) 720 typically provide data communication through one or more networks to other data devices. For example, a network link 720 may provide a connection through a local network 722 to a host computer 724 or to data equipment operated by an Internet Service Provider (ISP) 726. ISP 726 in turn provides data communication services through the world-wide packet data communication network now commonly referred to as the "Internet" 728. Local network(s) 722 and Internet 728 use electrical, electromagnetic or optical signals that carry digital data streams. The signals through the various networks and the signals on network link(s) 720 and through communication interface(s) 718, which carry the digital data to and from computing device 700, are example forms of transmission media.

Computing device 700 can send messages and receive data, including program code, through the network(s), network link(s) 720 and communication interface(s) 718. In the Internet example, a server 730 might transmit a requested code for an application program through Internet 728, ISP 726, local network(s) 722 and communication interface(s) 718.

The received code may be executed by processor 704 as it is received, and/or stored in storage device 710, or other non-volatile storage for later execution.

Basic Software System

Figure 8:
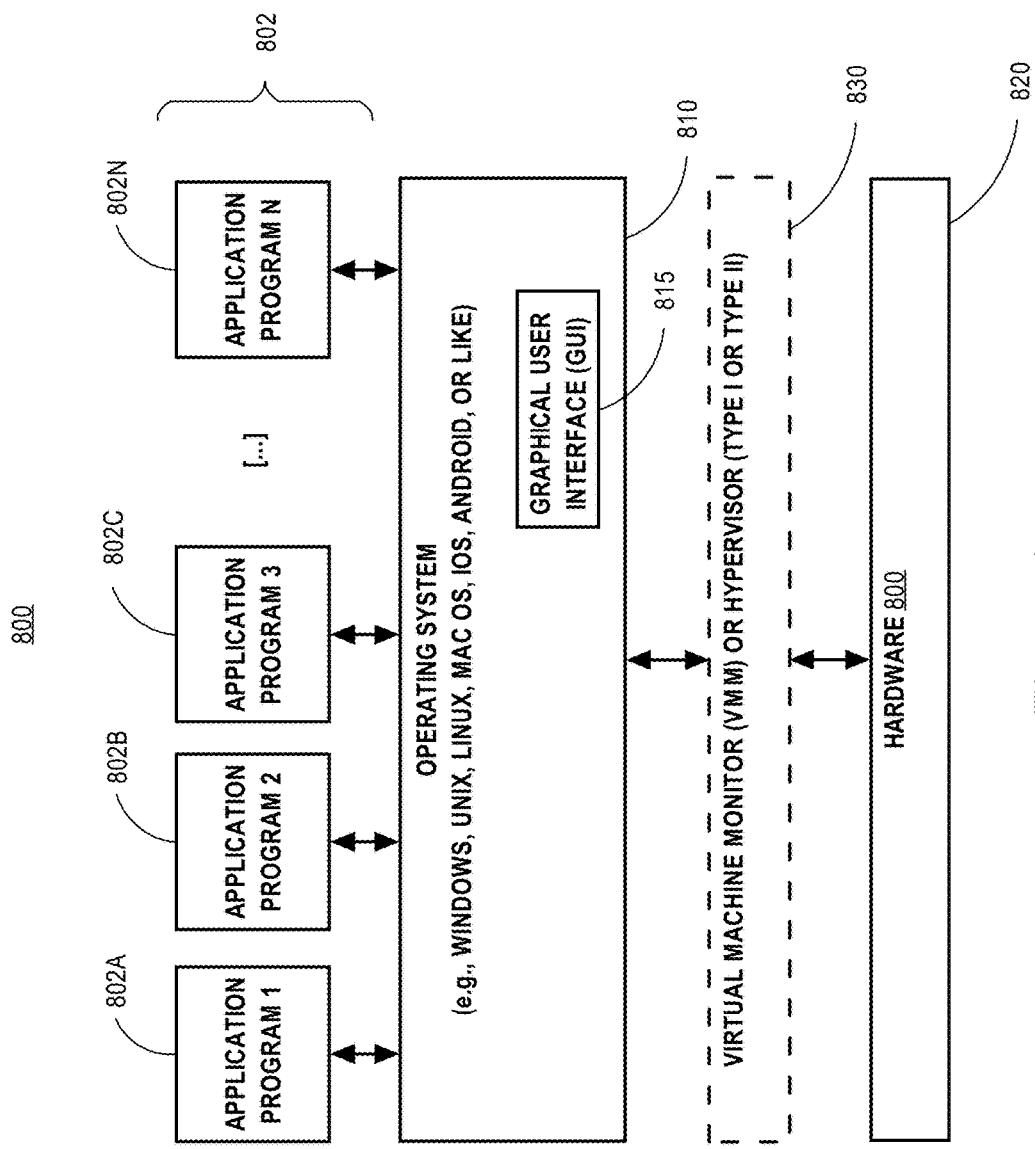
FIG. 8 is a block diagram of a basic software system that may be employed for controlling the operation of the basic computing device.
Figure 9:
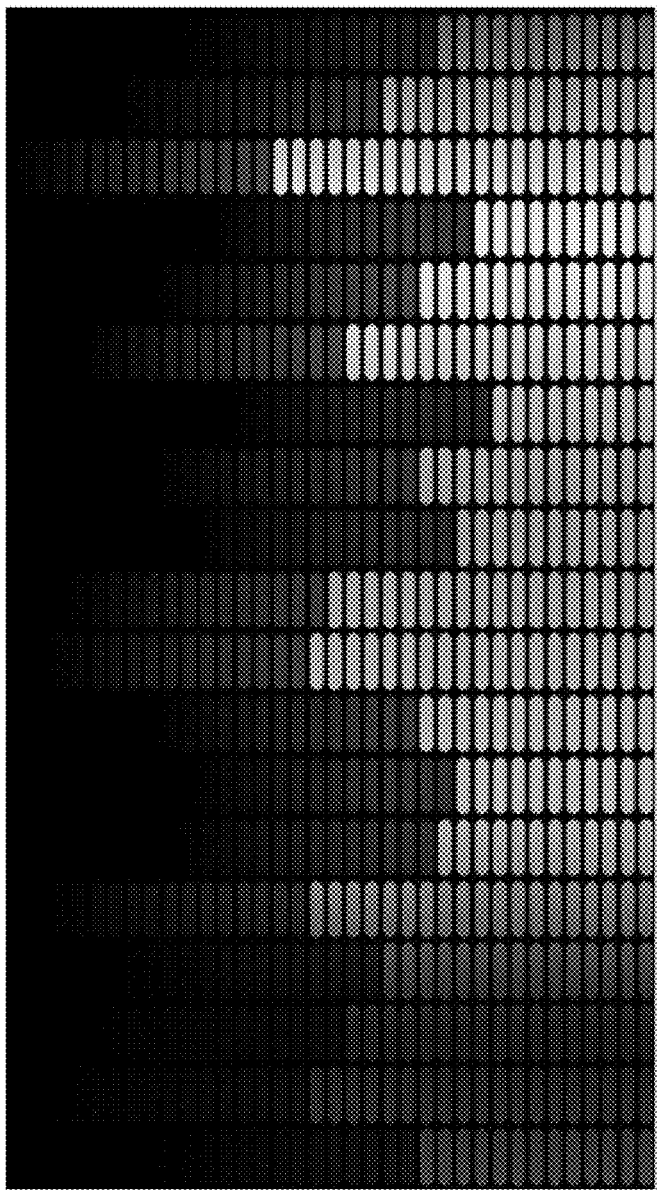
FIG. 9 is a screenshot of a basic visualization.

FIG. 8 is a block diagram of a basic software system 800 that may be employed for controlling the operation of computing device 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810.

In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same Revision of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

Extensions and Alternatives

In the foregoing specification, embodiments of the invention have been described regarding numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for generating a virtual music experience, the method performed by a computing system comprising one or more processors and memory storing one or more programs executed by the one or more processors to perform the method, the method comprising:
   source separating a digital music input into a plurality of source-separated tracks;
   determining sets of one or more music features from each source-separated track of the plurality of source-separated tracks including determining sets of one or more labeled onset music features from a particular source-separated track of the plurality of source-separated tracks; and
   on each event tick of a plurality of event ticks that occur at or approximately at a video frame rate of a video presentation system, providing a set of one or more music features, of the sets of one or more music features, in a data frame for the event tick including providing a set of one or more labeled onset music features, of the sets of one or more labeled onset music features, in the data frame for the event tick to the video presentation system thereby causing the video presentation system to change one or more visual properties of a graphical asset computer animated by the video presentation system at or approximately at the video frame rate.

2. The method of claim 1, further comprising:
   source separating the particular source-separated track of the plurality of source-separated tracks into a plurality of track-specific source separated tracks; and
   determining the set of one or more labeled onset music features from the plurality of track-specific source separated tracks.

3. The method of claim 1, wherein the digital music input comprises Pulse Code Modulation (PCM) samples.

4. The method of claim 1, wherein the set of one or more music features determined from the particular source-separated track of the plurality of source-separated tracks comprises one or more of spectrum, cestrum, amplitude, envelope, panorama, or formants.

5. The method of claim 1, wherein the set of one or more music features determined from the particular source-separated track of the plurality of source-separated tracks corresponds to a window of time of the digital music input, the window of time having a length, the length of the window of time being or approximately being eleven and one-half milliseconds.

6. The method of claim 1, wherein each music feature in the set of one or more music features determined from the particular source-separated track of the plurality of source-separated tracks is determined based, at least in part, on a window of pulse code modulation (PCM) samples from the particular source-separated track.

7. The method of claim 6, wherein the window of pulse code modulation (PCM) samples consists of 512 pulse code modulation (PCM) samples.

8. The method of claim 1, wherein each music feature in the set of one or more music features determined from the particular source-separated track of the plurality of source-separated tracks comprises a tag or label specifying the particular source-separated track that the music feature is determined from.

9. The method of claim 1, wherein the video frame rate of the video presentation system is or is approximately ninety frames per second.

10. A system comprising:
    one or more processors;
    storage media;
    one or more programs stored in the storage media and configured for execution by the one or more processors, the one or more programs comprising instructions configured for:
    source separating a digital music input into a plurality of source-separated tracks;
    determining sets of one or more music features from each source-separated track of the plurality of source-separated tracks including determining sets of one or more labeled onset music features from a particular source-separated track of the plurality of source-separated tracks; and
    on each event tick of a plurality of event ticks that occur at or approximately at a video frame rate of a video presentation system, providing a set of one or more music features, of the sets of one or more music features, in a data frame for the event tick including providing a set of one or more labeled onset music features, of the sets of one or more labeled onset music features, in the data frame for the event tick to the video presentation system thereby causing the video presentation system to change one or more visual properties of a graphical asset computer animated by the video presentation system at or approximately at the video frame rate.

11. The system of claim 10, the instructions further configured for:
   source separating the particular source-separated track of the plurality of source-separated tracks into a plurality of track-specific source separated tracks; and
   determining the set of one or more labeled onset music features from the plurality of track-specific source separated tracks.

12. The system of claim 10, wherein the graphical asset is a particle system.

13. The system of claim 10, wherein the plurality of source-separated tracks comprises a rhythm track, a bass track, a melody track, and a lead track.

14. The system of claim 10, the instructions further configured for:
   receiving the plurality of event ticks from the video presentation system at or approximately at the video frame rate of the video presentation system.

15. The system of claim 10, wherein each source-separated track of the plurality of source-separated tracks comprises a plurality of pulse code modulation (PCM) samples.

* * * * *